United States Patent
Irion et al.

(10) Patent No.: US 10,829,154 B2
(45) Date of Patent: Nov. 10, 2020

(54) METHOD AND DEVICE FOR OPERATING A VEHICLE

(71) Applicant: Robert Bosch GmbH, Stuttgart (DE)

(72) Inventors: Albrecht Irion, Stuttgart (DE); Hans-Joerg Mathony, Tamm-Hohenstange (DE); Rolf Nicodemus, Bietigheim-Bissingen (DE); Stefan Hoffmann, Bietigheim (DE); Stefan Nordbruch, Kornwestheim (DE); Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 15/515,701

(22) PCT Filed: Sep. 29, 2015

(86) PCT No.: PCT/EP2015/072330
§ 371 (c)(1),
(2) Date: Mar. 30, 2017

(87) PCT Pub. No.: WO2016/066353
PCT Pub. Date: May 6, 2016

(65) Prior Publication Data
US 2017/0297625 A1  Oct. 19, 2017

(30) Foreign Application Priority Data
Oct. 27, 2014  (DE) ........................ 10 2014 221 777

(51) Int. Cl.
*G05D 1/00* (2006.01)
*B62D 15/02* (2006.01)
(Continued)

(52) U.S. Cl.
CPC ......... *B62D 15/0285* (2013.01); *B60W 30/06* (2013.01); *B62D 15/027* (2013.01);
(Continued)

(58) Field of Classification Search
CPC . B60W 30/06; B62D 15/027; B62D 15/0285; G01C 21/36; G05D 1/0234;
(Continued)

(56) References Cited

U.S. PATENT DOCUMENTS 8,224,562 B2 * 7/2012 Katzer ............... G01C 21/3461
701/533
9,227,631 B2 * 1/2016 Kammel ............... B60W 30/06
(Continued)

FOREIGN PATENT DOCUMENTS

CN          102027318 A      4/2011
DE      102004027869 A1      1/2006
(Continued)

OTHER PUBLICATIONS

International Search Report dated Feb. 12, 2016, of the corresponding International Application PCT/EP2015/072330 filed Sep. 29, 2015.

*Primary Examiner* — Khoi H Tran
*Assistant Examiner* — B M M Hannan
(74) *Attorney, Agent, or Firm* — Norton Rose Fulbright US LLP; Gerard Messina

(57) ABSTRACT

A method for operating a vehicle, the vehicle receiving a digital map of a parking lot and at least one target position on the parking lot via a communication network, the vehicle navigating autonomously in the parking lot to the target position on the basis of the digital map, and the vehicle autonomously parking at the target position. A device for operating a vehicle, a vehicle, a server and a computer program are also described.

11 Claims, 2 Drawing Sheets

(51) Int. Cl.
*G08G 1/14* (2006.01)
*G08G 1/0968* (2006.01)
*B60W 30/06* (2006.01)
*G05D 1/02* (2020.01)
*G01C 21/36* (2006.01)
*G08G 1/09* (2006.01)
*G08G 1/0962* (2006.01)
*G08G 1/0967* (2006.01)
*G08G 1/16* (2006.01)

(52) U.S. Cl.
CPC .............. *G01C 21/36* (2013.01); *G05D 1/028* (2013.01); *G05D 1/0234* (2013.01); *G05D 1/0248* (2013.01); *G05D 1/0274* (2013.01); *G08G 1/094* (2013.01); *G08G 1/09626* (2013.01); *G08G 1/09685* (2013.01); *G08G 1/096725* (2013.01); *G08G 1/096816* (2013.01); *G08G 1/143* (2013.01); *G08G 1/146* (2013.01); *G08G 1/148* (2013.01); *G05D 2201/0213* (2013.01); *G08G 1/163* (2013.01)

(58) Field of Classification Search
CPC .... G05D 1/0248; G05D 1/0274; G05D 1/028; G05D 2201/0213; G08G 1/094; G08G 1/09626; G08G 1/096725; G08G 1/096816; G08G 1/09685; G08G 1/143; G08G 1/146; G08G 1/148; G08G 1/163
USPC .......................................................... 701/24
See application file for complete search history.

(56) References Cited

U.S. PATENT DOCUMENTS

| | | | | |
|---|---|---|---|---|
| 10,156,848 | B1* | 12/2018 | Konrardy | G01C 21/34 |
| 2002/0171562 | A1 | 11/2002 | Muraki | |
| 2003/0078720 | A1* | 4/2003 | Adachi | G09B 29/10 |
| | | | | 701/446 |
| 2005/0246096 | A1* | 11/2005 | Bracht | B60Q 1/143 |
| | | | | 701/431 |
| 2007/0040701 | A1 | 2/2007 | Browne et al. | |
| 2010/0156672 | A1 | 6/2010 | Yoo et al. | |
| 2012/0188100 | A1* | 7/2012 | Min | G08G 1/143 |
| | | | | 340/932.2 |
| 2012/0200430 | A1* | 8/2012 | Spahl | G01C 21/3685 |
| | | | | 340/932.2 |
| 2013/0231824 | A1* | 9/2013 | Wilson | G01C 21/3415 |
| | | | | 701/26 |
| 2014/0249742 | A1* | 9/2014 | Krivacic | G06Q 10/02 |
| | | | | 701/400 |
| 2014/0292541 | A1* | 10/2014 | Korman | G08G 1/143 |
| | | | | 340/932.2 |
| 2014/0350855 | A1* | 11/2014 | Vishnuvajhala | G01C 21/3685 |
| | | | | 701/538 |
| 2015/0073645 | A1* | 3/2015 | Davidsson | B62D 15/0285 |
| | | | | 701/23 |
| 2015/0149265 | A1* | 5/2015 | Huntzicker | B60W 30/06 |
| | | | | 705/13 |
| 2015/0241241 | A1* | 8/2015 | Cudak | B62D 15/027 |
| | | | | 701/408 |
| 2017/0308092 | A1* | 10/2017 | Altinger | G05D 1/0246 |

FOREIGN PATENT DOCUMENTS

| | | |
|---|---|---|
| DE | 102004032346 A1 | 1/2006 |
| DE | 102005029336 A1 | 4/2006 |
| DE | 102006050550 A1 | 4/2008 |
| DE | 102008020447 A1 | 3/2009 |
| DE | 102008027692 A1 | 12/2009 |
| DE | 102008055881 A1 | 5/2010 |
| DE | 102010029419 A1 | 12/2010 |
| DE | 102009029117 A1 | 3/2011 |
| DE | 102009046912 A1 | 5/2011 |
| DE | 102009051463 A1 | 5/2011 |
| DE | 102011082478 A1 | 3/2013 |
| DE | 102011084124 A1 | 4/2013 |
| DE | 102012222562 A1 | 6/2014 |
| DE | 102013205392 A1 | 10/2014 |
| JP | 2004352110 A | 12/2004 |
| JP | 2007233771 A | 9/2007 |
| JP | 2011054116 A | 3/2011 |
| JP | 2011065279 A | 3/2011 |
| KR | 20060073414 A | 6/2006 |
| WO | 2016083028 A1 | 6/2016 |

\* cited by examiner

METHOD AND DEVICE FOR OPERATING A VEHICLE

FIELD

The present invention relates to a method and to a device for operating a vehicle. The present invention furthermore relates to a vehicle, to a server and to a computer program.

BACKGROUND INFORMATION

In a fully automated (autonomous) so-called valet parking operation, a driver parks his vehicle at a drop-off point, e.g., in front of a parking garage, and the vehicle drives on its own from there to a parking position/parking bay and back again to the hand-over point.

Conventional navigation systems normally do not include digital maps of parking lots so that an autonomous vehicle navigation within a parking lot becomes more difficult if not impossible.

Japanese Patent Application No. JP 002007233771 A describes a parking robot as a pilot which steers a vehicle to a parking position. The vehicle follows the parking robot on its own.

SUMMARY

An object of the present invention includes providing an operation of a vehicle that allows for an autonomous navigation of the vehicle within a parking lot.

An object if the present invention includes indicating a corresponding device for operating a vehicle.

An object of the present invention includes providing a corresponding vehicle.

An object of the present invention includes providing a corresponding server.

An object of the present invention includes providing a corresponding computer program.

Advantageous further developments of the present invention are described herein.

According to one aspect of the present invention, a method for operating a vehicle is provided,
in which a digital map of a parking lot and at least one target position in the parking lot are received by the vehicle via a communication network,
the vehicle autonomously navigates in the parking lot to the target position on the basis of the digital map, and
the vehicle parks itself autonomously at the target position.

According to still another aspect, a device for operating a vehicle is provided, which includes
a communications interface that is designed to receive a digital map of a parking lot and a target position in the parking lot via a communication network, and
a guidance device, which is designed to guide the vehicle autonomously in the parking lot to the target position on the basis of the digital map and to park the vehicle autonomously at the target position.

According to a further aspect, a vehicle is provided which is designed to execute the method according to the present invention.

According to still another aspect, a server is provided, which includes
a database in which a digital map of a parking space is stored,
a processor, which is developed to ascertain at least one target position in the parking lot, and
a communications interface, which is developed to transmit the digital map and the target position via a communication network to a vehicle.

According to still another aspect, a computer program is provided which includes program code for carrying out the method of the present invention when the computer program is executed on a computer.

In other words, the present invention includes transmitting a digital map of the parking lot to the vehicle via a communication network. Furthermore, at least one target position in the parking lot is transmitted to the vehicle via the communication network. Thus, the vehicle is advantageously able to navigate to the target position in the parking lot in an autonomous manner. An autonomous navigation of the vehicle in a parking lot is therefore advantageously made possible.

A parking lot within the meaning of the present invention may also be referred to as a parking area and is used for parking vehicles. Thus, the parking lot particularly constitutes a contiguous area that has a plurality of parking positions (in a parking lot on private property) or parking slots (in a parking lot on public property). The parking lot may be part of an enclosed parking structure. In particular, the parking lot is part of a garage.

Autonomous within the meaning of the present invention particularly means that the vehicle navigates on its own without an intervention of a driver. In other words, the vehicle is driving by itself in the parking lot without a driver having to control the vehicle for this purpose. Therefore, this particularly means that the guidance device for the navigation controls the vehicle autonomously. The guidance particularly encompasses a lateral and/or longitudinal guidance of the vehicle. In autonomous driving or an autonomous navigation, the driver thus does not have to be inside the vehicle.

According to a specific embodiment, the at least one target position is a drop-off position where a driver is able to park his vehicle for an autonomous parking operation and/or it includes a parking position at which the vehicle is meant to park autonomously.

This results in the particular technical advantage that an autonomous parking operation (valet parking) is able to be carried out in a parking lot. In particular, this means that the vehicle advantageously drives on its own, i.e., autonomously, from the drop-off position to the parking position and then back again.

According to a specific embodiment, the vehicle receives a plurality of target positions via the communication network. The vehicle selects from the received target positions the one to which it navigates.

According to a specific embodiment, the vehicle receives at least one target position, and especially multiple target positions, via the communication network, and the vehicle travels to the target position or to the target positions as a function of the priorities allocated to the respective target position(s). In other words, the target positions have a respective priority, and different priorities, in particular; the priorities specify a sequence in which the vehicle is to drive to the target positions, and it is provided in particular that the vehicle drive to the target positions in accordance with the sequence.

According to another specific embodiment, a route within the parking lot leading to the target position is ascertained on the basis of the digital map, and the navigation includes travel of the route.

This results in the particular technical advantage that the navigation is able to be carried out in an especially efficient manner since the route to be traveled is already established. As a result, all that remains is for the vehicle to drive the route in order to reach the target position. This advantageously accelerates a navigation of the vehicle in the parking lot. In particular, the vehicle is thereby advantageously able to reach its target position more rapidly.

According to another specific embodiment, the route is ascertained from outside the vehicle and transmitted to the vehicle via the communication network, or the route is ascertained within the vehicle.

According to a specific embodiment, for example, the vehicle-external ascertainment may be undertaken with the aid of a server, or more precisely, with the aid of a processor. To carry out the vehicle-internal ascertainment of the route, the guidance device according to a specific embodiment includes a processor, which is appropriately designed to ascertain the route. A vehicle-external ascertainment provides the particular technical advantage that the vehicle does not have to reserve any resources of its own for this purpose. Generally, it is also the case that an external system, in this instance the server, for example, is better informed about traffic in the parking lot than the vehicle itself. Thus, the server is advantageously able to calculate a route that leads through the already present traffic as rapidly and efficiently as possible, so that slow traffic or congestion is able to be avoided. A vehicle-internal ascertainment of the route in particular has the technical advantage that no connection to the server via the communication network is required. The route is therefore able to be determined even in the absence of a connection to the server via the communication network. In other words, the vehicle is independent of an external system with regard to the ascertainment of the route, in this case, the server, for example.

In a specific embodiment, a route to the target position is ascertained both outside as well as inside the vehicle, and the route ascertained outside the vehicle is then transmitted to the vehicle via the communication network. The vehicle compares the two routes and makes a decision as to which route it will travel.

A route within the meaning of the present invention includes a starting position and a target position. The vehicle preferably navigates to the starting position and drives from there along the route to the target position. The starting position in particular corresponds to the drop-off position where the driver is able to park and leave the car in order for the vehicle to then drive to the parking position in an autonomous manner.

In a specific embodiment, the vehicle navigates autonomously from the drop-off position to the parking position.

In another specific embodiment, the vehicle parks autonomously in the parking position.

In another specific embodiment, the vehicle autonomously leaves the parking position.

According to another specific embodiment, the vehicle navigates autonomously from the parking position to the drop-off position.

In another specific embodiment, the vehicle senses at least one landmark encompassed by the parking lot during the navigation process, and a current position of the vehicle on the digital map is ascertained on the basis of the sensed landmark, the navigation being additionally undertaken on the basis of the ascertained current position.

Thus, this specifically means that the parking lot includes a landmark that the vehicle utilizes during the navigation for orientation purposes. This provides the particular technical advantage of allowing a navigation to be carried out even more efficiently. In particular, an ascertained route is advantageously able to be checked for correctness. Preferably, a plurality of landmarks is provided. A landmark, for example, is a visual landmark such as a barcode. A landmark is an RFID sensor, for instance.

According to another specific embodiment, the vehicle senses its surroundings during the navigation, the navigation additionally being carried out on the basis of the sensed surroundings.

This results in the particular technical advantage that a navigation of the vehicle in the parking lot is able to be carried out in an especially efficient manner. In particular, the vehicle is advantageously able to detect obstacles so that the vehicle can drive around these obstacles.

A environmental sensor system is provided for the sensing operation. An environmental sensor system, for example, includes one or more environmental sensor(s) such as ultrasonic sensors, LIDAR sensors, laser sensors, video sensors or radar sensors.

A vehicle uses such an environmental sensor system to detect its environment, and the navigation is carried out on the basis of the sensed environment, in particular. Thus, for example, the vehicle is able to detect obstacles and drive around them. With the aid of the environmental sensor system, for instance, the vehicle is able to identify where it is located in the parking lot in relation to the digital map. One or a plurality of sensed landmark(s) is/are preferably used for this identification.

In a specific embodiment, the parking lot includes a WLAN, on the basis of which the vehicle carries out the navigation, in particular a localization with regard to where the vehicle is located relative to the digital map.

According to a specific embodiment, the communication network includes a mobile telephone network and/or a WLAN network.

According to an additional specific embodiment, the processor of the server is set up to ascertain a route that lies within the parking lot and leads to the target position on the basis of the digital map, and the communications interface is designed to transmit the ascertained route via the communication network to the vehicle.

The communication via the communication network, in particular between the vehicle and the server, preferably takes place in encrypted form.

Below, the present invention is described in greater detail on the basis of preferred exemplary embodiments.

DETAILED DESCRIPTION OF EXAMPLE EMBODIMENTS

Figure 1:
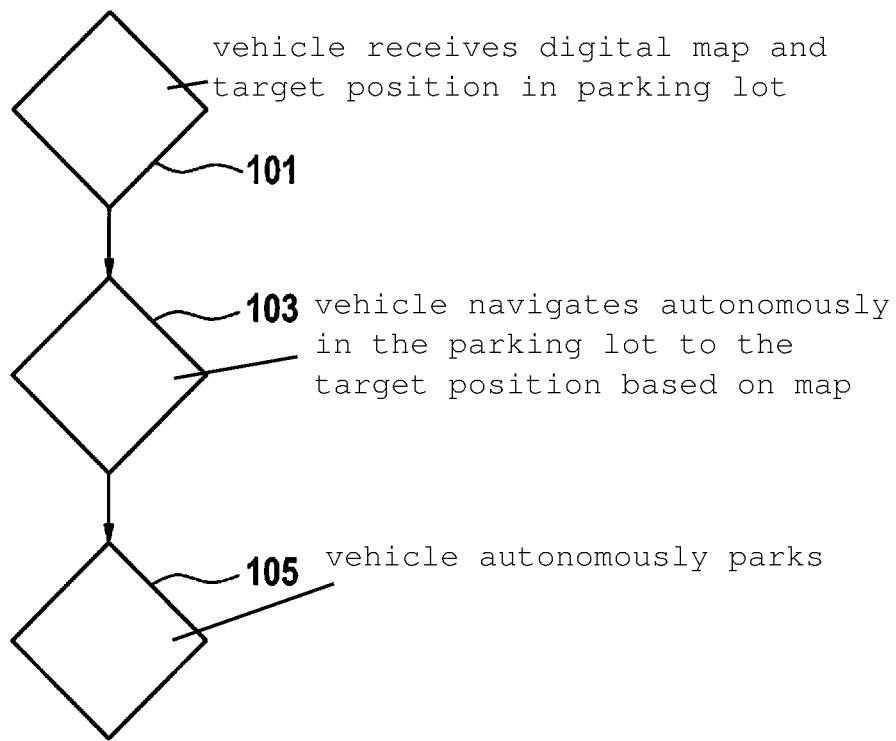
FIG. 1 shows a flow diagram of a method for operating a vehicle.

FIG. 1 shows a flow diagram of a method for operating a vehicle.

According to a step 101, the vehicle receives a digital map of a parking lot and at least one target position in the parking lot via a communication network. The digital map and the at least one target position are able to be transmitted to the vehicle with the aid of a server, such as via the communication network.

In a step 103, the vehicle navigates autonomously, i.e., on its own, in the parking lot to the target position on the basis of the digital map. In a step 105, the vehicle parks autonomously at the target position. In other words, once the vehicle has reached the target position, the vehicle parks autonomously at the target position.

The target position, for example, includes a drop-off position and/or a parking position. This specifically means that the vehicle drives from the drop-off position to the parking position and parks there by itself. In other words, the vehicle drives back from the parking position to the drop-off position on its own, i.e. autonomously. Thus, a driver is able to park the vehicle at the drop-off position, in particular. The vehicle then drives to the parking position autonomously and parks there on its own. At a later point in time, the vehicle then drives by itself, that is to say, autonomously, from the parking position back to the drop-off position, so that the driver may get into the car again and thereby pick it up at the drop-off position.

Figure 2:
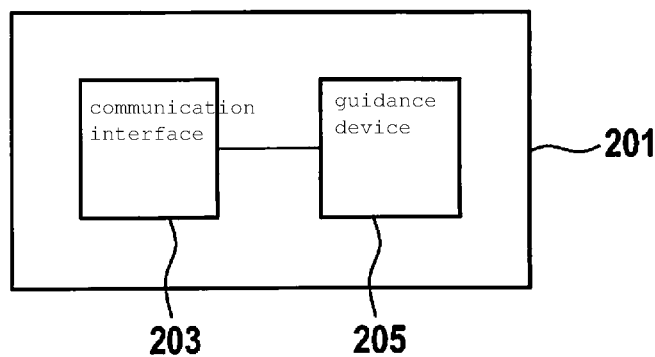
FIG. 2 shows a device for operating a vehicle.

FIG. 2 shows a device 201 for operating a vehicle.

Device 201 includes a communications interface 203, which is designed to receive a digital map of a parking lot and a target position in the parking lot via a communication network. Device 201 includes a guidance device 205, which is designed to guide the vehicle autonomously in the parking lot to the target position on the basis of the digital map, and to park the vehicle at the target position in an autonomous manner.

According to a specific embodiment, the communication network includes a mobile telephony network and/or a WLAN network.

According to a specific embodiment, the guidance for the navigation encompasses a linear and/or lateral guidance of the vehicle by the guidance device. In other words, the guidance device controls or regulates a linear and/or lateral guidance of the vehicle, in particular.

Figure 3:
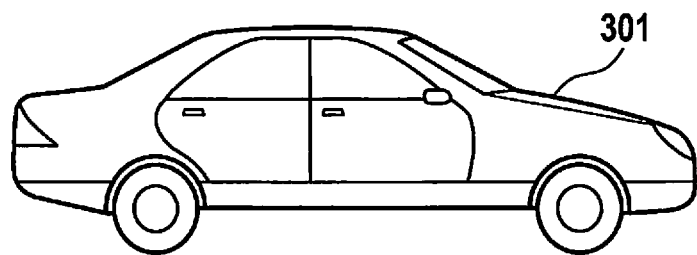
FIG. 3 shows a vehicle.

FIG. 3 shows a vehicle 301, which is designed to carry out the method according to the present invention. More specifically, this means that vehicle 301 is set up to navigate autonomously from a drop-off position to the parking position and back again. This navigation is based on the digital map and the target position. Vehicle 301, for example, includes device 201 from FIG. 2. In particular, vehicle 301 includes an environmental sensor system for sensing the vehicle environment.

Figure 4:
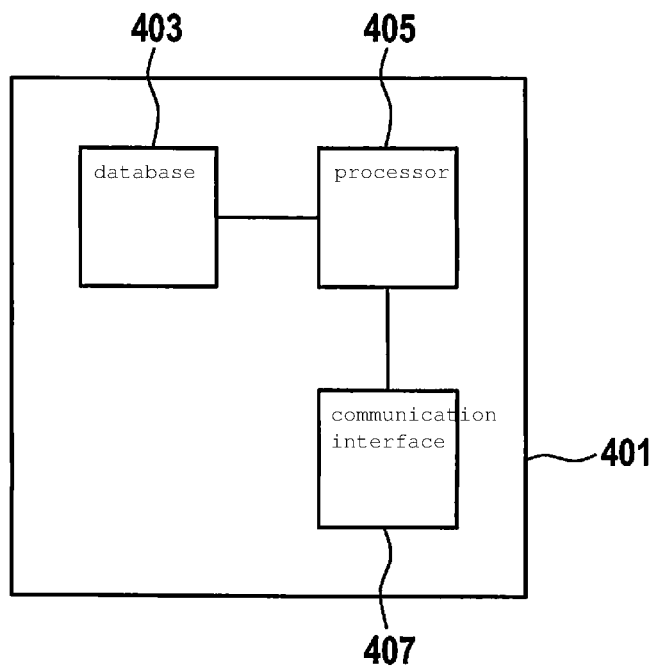
FIG. 4 shows a server.

FIG. 4 shows a server 401.

Server 401 includes a database 403 in which a digital map of a parking lot is stored. Server 401 furthermore includes a processor 405, which is designed to ascertain at least one target position in the parking lot. In addition, server 401 includes a communications interface 407, which is designed to transmit the digital map as well as the target position to a vehicle via a communication network.

In one specific embodiment, processor 405 of server 401 is developed to ascertain a route, situated within a parking lot, to the target position on the basis of the digital map; communications interface 407 is designed to transmit the ascertained route via the communication network to the vehicle.

The present invention thus particularly encompasses the notion of the vehicle navigating to the target position, i.e. the parking position or the parking bay, for instance, on its own, that is to say, autonomously, on the basis of transmitted and/or provided information (here, the digital map and the at least one target position) as well as on the basis of its own sensor system such as an environmental sensor system (e.g., video camera, laser sensor, ultrasonic sensor, LIDAR sensor or radar sensor). In other words, this means that the necessary information includes a digital map of the parking lot, in particular the parking garage. The digital map, for example, is a highly precise digital map of the parking garage/parking lot. The necessary information specifically includes one or more target position(s). In other words, this information is transmitted to the vehicle via the communication network.

To supplement an infrastructure, a localization system, e.g., landmarks such as visual landmarks, e.g., barcodes and/or RFID sensors, preferably exists as the basis in the parking garage or in the parking lot. In particular, the parking lot, especially the parking garage, encompasses as infrastructure a WLAN. In other words, this means that a localization of the vehicle is able to be carried out on the basis of a WLAN measurement.

Specific embodiments, which are not shown, include one or more of the following exemplary feature(s):
  The vehicle is parked at the drop-off point or the drop-off position (also referred to as drop-off zone).
  A parking lot management transmits a highly precise parking-garage map/parking lot map (digital map) to the vehicle (for instance even already in advance, i.e., prior to the vehicle being parked at the drop-off point).
  The parking lot management transmits to the vehicle a reserved target position for the parking operation (for example possibly already in advance, i.e., prior to the vehicle being parked at the drop-off location).
  The vehicle calculates or ascertains a travel path (route) to the target parking position (target position), and/or the parking lot management calculates or ascertains the travel path (route) to the target parking position and transmits it to the vehicle;
  The vehicle drives the path (route) to the target position.
  En route (during the navigation) the vehicle localizes itself via
    the digital map, preferably
  in conjunction with
    for instance, landmarks (see above), which are detected and evaluated by the own sensor system (environmental sensor system of the vehicle), and/or
    preferably, WLAN and/or
    preferably, onboard sensors (video, radar, lidar, etc.).
    Along the route, the onboard sensors, in particular the environmental sensor system, detect(s) possible obstacles and if required, such obstacles are circumvented or it is stopped in front of them.
  The vehicle parks in the parking position with the aid of a parking assistant, for example.
  The return route from the parking position to the drop-off point takes place in an analogous manner.
  In specific embodiment, the parking garage/parking lot has its own reserved area for the fully automatic or autonomous valet parking. In this way, potential problems caused by mixed traffic or by pedestrians etc. are circumvented.

In a first refinement stage (i.e., in one specific embodiment), the parking garage/the parking lot may reserve a separate area for the fully automated valet parking. This would circumvent potential problems resulting from mixed traffic or pedestrians, etc.

In another specific embodiment, the parking lot management uses parking space monitoring (e.g., with the aid of video cameras) to monitor the travel of the vehicle the entire time. In case of problems, the parking lot management is able to interrupt the travel by a "stop signal" in one specific embodiment.

According to a specific embodiment, the transfer of the information is carried out using C2X systems (for instance via WLAN), preferably in encrypted form.

What is claimed is:

1. A method for operating a vehicle, comprising:
receiving by the vehicle via a communication network a digital map of a parking lot and at least one target position;
navigating autonomously, by the vehicle, in the parking lot to the target position on the basis of the digital map; and
autonomously parking, by the vehicle, at the target position,
wherein a first route from a drop-off position to the target position is ascertained from the digital map and a second route from the target position to the drop-off position is ascertained from the digital map,
wherein the vehicle receives multiple target positions via the communication network, and the vehicle travels to the target position as a function of priorities allocated to a respective target position, each of the priorities specifying a sequence in which the vehicle is to drive to the respective target position.

2. The method as recited in claim 1, wherein the at least one target position includes at least one of: i) the drop-off position at which a driver of the vehicle is able to park the vehicle for an autonomous parking operation, and ii) a parking position at which the vehicle is to park autonomously.

3. The method as recited in claim 1, wherein a route to the target position lying within the parking lot is ascertained on the basis of the digital map, and the navigation includes traveling the route.

4. The method as recited in claim 3, wherein one of: i) a route to the target position is ascertained outside the vehicle and transmitted to the vehicle via the communication network, or ii) the route to the target position is ascertained inside the vehicle.

5. The method as recited in claim 1, wherein the vehicle senses at least one landmark encompassed by the parking lot during the navigation, a current position of the vehicle on the digital map being ascertained on the basis of the detected landmark, and the navigation is additionally carried out on the basis of the ascertained current position.

6. The method as recited in claim 1, wherein the vehicle senses its environment during the navigation, and the navigation is carried out on the basis of the sensed surroundings.

7. A device for operating a vehicle, comprising:
a communications interface designed to receive a digital map of a parking lot and a target position in the parking lot via a communication network; and
a guidance device designed to guide the vehicle autonomously in the parking lot to the target position on the basis of the digital map and to park the vehicle autonomously at the target position,
wherein a first route from a drop-off position to the target position is ascertained from the digital map and a second route from the target position to the drop-off position is ascertained from the digital map,
wherein the vehicle receives multiple target positions via the communication network, and the vehicle travels to the target position as a function of priorities allocated to a respective target position, each of the priorities specifying a sequence in which the vehicle is to drive to the respective target position.

8. A vehicle, designed to:
receive via a communication network a digital map of a parking lot and at least one target position;
navigate autonomously in the parking lot to the target position on the basis of the digital map; and
autonomously park at the target position,
wherein a first route from a drop-off position to the target position is ascertained from the digital map and a second route from the target position to the drop-off position is ascertained from the digital map,
wherein the vehicle receives multiple target positions via the communication network, and the vehicle travels to the target position as a function of priorities allocated to a respective target position, each of the priorities specifying a sequence in which the vehicle is to drive to the respective target position.

9. A server, comprising:
a database in which a digital map of a parking lot is stored;
a processor designed to ascertain at least one target position in the parking lot; and
a communications interface designed to transmit the digital map and the target position via a communication network to a vehicle,
wherein a first route from a drop-off position to the target position is ascertained from the digital map and a second route from the target position to the drop-off position is ascertained from the digital map,
wherein the vehicle receives multiple target positions via the communication network, and the vehicle travels to the target position as a function of priorities allocated to a respective target position, each of the priorities specifying a sequence in which the vehicle is to drive to the respective target position.

10. The server as recited in claim 9, wherein the processor is designed to ascertain a route to the destination position lying within the parking lot on the basis of the digital map, and the communications interface is designed to transmit the ascertained route via the communication network to the vehicle.

11. A non-transitory computer-readable storage medium on which is stored a computer program including program code for operating a vehicle, the computer program, when executed by a computer, causing the computer to perform:
receiving by the vehicle via a communication network a digital map of a parking lot and at least one target position;
navigating autonomously, by the vehicle, in the parking lot to the target position on the basis of the digital map; and
autonomously parking, by the vehicle, at the target position, wherein a first route from a drop-off position to the target position is ascertained from the digital map and a second route from the target position to the drop-off position is ascertained from the digital map,
wherein the vehicle receives multiple target positions via the communication network, and the vehicle travels to the target position as a function of priorities allocated to a respective target position, each of the priorities specifying a sequence in which the vehicle is to drive to the respective target position.

* * * * *